US011167912B2

(12) United States Patent
Weaver et al.

(10) Patent No.: US 11,167,912 B2
(45) Date of Patent: Nov. 9, 2021

(54) PREFORM WITH VALVE ANTI-REMOVAL FEATURE

(71) Applicant: The Procter & Gamble Company, Cincinnati, OH (US)

(72) Inventors: Kerry Lloyd Weaver, Florence, KY (US); Robert Earl Magness, Mason, OH (US); Andrew William Franckhauser, Batavia, OH (US); Scott Edward Smith, Cincinnati, OH (US); Nathan Daniel Grubbs, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/125,811

(22) Filed: Sep. 10, 2018

(65) Prior Publication Data

US 2019/0077583 A1  Mar. 14, 2019

Related U.S. Application Data

(63) Continuation-in-part of application No. 15/702,783, filed on Sep. 13, 2017.

(30) Foreign Application Priority Data

Oct. 30, 2017  (EP) .................................. 17199207

(51) Int. Cl.
  *B65D 83/44* (2006.01)
  *B29B 11/14* (2006.01)
  (Continued)

(52) U.S. Cl.
  CPC .............. *B65D 83/44* (2013.01); *B29B 11/14* (2013.01); *B65D 83/28* (2013.01); *B65D 83/38* (2013.01);
  (Continued)

(58) Field of Classification Search
  CPC . B29B 2911/14413; B29B 2911/14453; B29B 11/14; B29K 2023/12;
  (Continued)

(56) References Cited

U.S. PATENT DOCUMENTS 2,863,699 A   12/1958  Elser
3,333,743 A    8/1967  Meyers
(Continued)

FOREIGN PATENT DOCUMENTS

CA        966433 A  *  4/1975  ............. B65D 83/38
CA        966433 A     4/1975
(Continued)

OTHER PUBLICATIONS

International Search Report and Written Opinion dated Nov. 29, 2018, U.S. Appl. No. 15/702,783, 16 pgs.
(Continued)

*Primary Examiner* — Vishal Pancholi
*Assistant Examiner* — Robert K Nichols, II
(74) *Attorney, Agent, or Firm* — Sarah M DeCristofaro; Steven Robert Chuey

(57) ABSTRACT

A preform suitable for blow molding into for an outer container usable for a pressurized aerosol dispenser. The preform has a longitudinal axis and a closed end bottom, an open neck. The neck has threads for accepting a valve having complementary threads. At least one pawl or ratchet is operatively juxtaposed with the periphery of the preform. The at least one pawl or ratchet allows onward rotation of the complementary valve in an onward direction, and prevents detachment of the valve in a reverse rotation direction. Any such preform can be blow molded into a corresponding outer container, and any such outer container can be blow molded from a corresponding preform.

15 Claims, 10 Drawing Sheets

(51) Int. Cl.
  *B65D 83/28* (2006.01)
  *B65D 83/38* (2006.01)
  *B29L 31/00* (2006.01)
  *B29K 67/00* (2006.01)
  *B29K 23/00* (2006.01)

(52) U.S. Cl.
  CPC .............. *B29B 2911/14413* (2013.01); *B29B 2911/14453* (2013.01); *B29K 2023/12* (2013.01); *B29K 2067/003* (2013.01); *B29L 2031/7142* (2013.01)

(58) Field of Classification Search
  CPC ...... B29K 2067/003; B29L 2031/7142; B65D 83/44; B65D 83/829; B65D 811/14; B65D 83/28; B65D 83/38; B65D 55/022; B65D 50/00; B65D 83/62; B65D 41/0471; B65D 2255/20; B05B 11/008; B05B 11/0013
  USPC ...... 222/153.09, 399, 402.1, 402.21–402.25, 222/394, 386.5; 215/330
  See application file for complete search history.

(56) References Cited

U.S. PATENT DOCUMENTS

| | | | |
|---|---|---|---|
| 3,343,730 A * | 9/1967 | Nier | B65D 83/38 222/402.24 |
| 3,403,804 A | 10/1968 | Colombo | |
| 3,450,254 A | 6/1969 | Miles | |
| 3,717,287 A * | 2/1973 | Marand | B65D 41/0414 222/153.14 |
| 3,977,557 A * | 8/1976 | Hazard | B65D 55/022 215/274 |
| 4,030,644 A * | 6/1977 | Creighton | B65D 83/48 222/396 |
| 4,114,779 A | 9/1978 | Stoll, III | |
| RE30,093 E | 9/1979 | Burger | |
| 4,281,778 A * | 8/1981 | Stull | B65D 47/148 215/214 |
| 4,323,203 A | 4/1982 | Neufeld | |
| 4,330,066 A | 5/1982 | Berliner | |
| 4,345,691 A | 8/1982 | Burke | |
| 4,366,921 A | 1/1983 | Kirk, Jr. | |
| 4,934,547 A | 6/1990 | Mayes | |
| 4,969,577 A | 11/1990 | Werding | |
| 4,984,717 A | 1/1991 | Burton | |
| 5,184,747 A | 2/1993 | Nolte | |
| 5,219,005 A | 6/1993 | Stoffel | |
| 5,394,364 A | 2/1995 | Masuda | |
| 5,507,420 A | 4/1996 | Oneill | |
| 5,839,623 A | 11/1998 | Losenno | |
| 6,019,252 A | 2/2000 | Benecke et al. | |
| 6,254,820 B1 | 7/2001 | Cornell | |
| 6,375,045 B1 | 2/2002 | Ki | |
| 7,028,866 B2 | 4/2006 | Kunesh et al. | |
| 7,279,207 B2 | 10/2007 | Darr | |
| 7,303,087 B2 | 12/2007 | Flashinski et al. | |
| 8,074,847 B2 | 12/2011 | Smith | |
| 8,096,327 B2 | 1/2012 | Hirz | |
| 8,439,223 B2 | 5/2013 | Smith et al. | |
| 8,505,762 B2 | 8/2013 | Holbach et al. | |
| 8,511,522 B2 | 8/2013 | Chan et al. | |
| 8,631,632 B2 | 1/2014 | Morales et al. | |
| 8,752,731 B2 | 6/2014 | Nimmo et al. | |
| 8,844,765 B2 | 9/2014 | Tryon | |
| 8,869,842 B2 | 10/2014 | Smith | |
| 8,944,292 B2 | 2/2015 | Moreau | |
| 9,045,325 B2 | 6/2015 | Apps | |
| 9,061,795 B2 | 6/2015 | Girardot et al. | |
| 9,132,955 B2 | 9/2015 | Smith et al. | |
| 9,174,229 B2 | 11/2015 | Smith | |
| 9,296,550 B2 | 3/2016 | Smith et al. | |
| 9,334,103 B2 | 5/2016 | Soliman | |
| 9,394,098 B2 | 7/2016 | Kohls et al. | |
| 9,505,509 B2 | 11/2016 | Smith | |
| 2002/0027146 A1 | 3/2002 | De | |
| 2009/0014679 A1 | 1/2009 | Hygema et al. | |
| 2011/0248035 A1 | 10/2011 | Peirsman | |
| 2012/0211458 A1 * | 8/2012 | Patel | B65D 83/38 215/44 |
| 2012/0291911 A1 | 11/2012 | Smith | |
| 2014/0183222 A1 | 7/2014 | Morrison | |
| 2015/0034682 A1 | 2/2015 | Seling | |
| 2016/0368700 A1 | 12/2016 | Smith et al. | |
| 2017/0129690 A1 | 5/2017 | Sugawara | |
| 2018/0043604 A1 | 2/2018 | Zeik et al. | |
| 2018/0044096 A1 | 2/2018 | Neumann | |
| 2019/0077558 A1 | 3/2019 | Smith | |
| 2019/0077582 A1 | 3/2019 | Franckhauser | |
| 2019/0077583 A1 | 3/2019 | Weaver | |
| 2019/0077584 A1 | 3/2019 | Magness | |

FOREIGN PATENT DOCUMENTS

| | | |
|---|---|---|
| DE | 102013107061 A1 | 1/2015 |
| WO | WO 91/08099 A1 | 6/1991 |
| WO | WO2017052165 A1 | 3/2017 |
| WO | WO2018065780 A1 | 4/2018 |

OTHER PUBLICATIONS

International Search Report and Written Opinion dated Nov. 29, 2018, U.S. Appl. No. 16/125,813, 16 pgs.
International Search Report and Written Opinion dated Nov. 30, 2018, U.S. Appl. No. 16/125,811, 14 pgs.
International Search Report and Written Opinion dated Nov. 30, 2018, U.S. Appl. No. 16/125,815, 16 pgs.
All Office Actions, U.S. Appl. No. 16/125,813.
All Office Actions, U.S. Appl. No. 16/125,815.
All Office Actions, U.S. Appl. No. 15/702,783.
14943 Extended EP Search Report for 17199207.6 dated Aug. 8, 2018, 10 pages.

* cited by examiner

PREFORM WITH VALVE ANTI-REMOVAL FEATURE

FIELD OF THE INVENTION

The present invention relates to preforms for aerosol dispensers having an anti-rotation feature.

BACKGROUND OF THE INVENTION

Aerosol dispensers are well known in the art. Aerosol dispensers typically comprise an outer container which acts as a frame for the remaining components and as a pressure vessel for propellant and product contained therein. Outer containers made of metal are well known in the art. However, metal containers can be undesirable due to high cost and limited recyclability. Attempts to use plastic have occurred in the art. Relevant attempts in the art to employ plastic in aerosol dispensers are found in U.S. Pat. Nos. 2,863,699; 3,333,743; 4,969,577; 8,752,731; 9,296,550; 9,334,103 and 2009/0014679.

The outer containers are typically, but not necessarily, cylindrical. The outer container may comprise a bottom for resting on horizontal surfaces such as shelves, countertops, tables etc. The bottom of the outer container may comprise a re-entrant portion as shown in U.S. Pat. No. 3,403,804 or a base cup as shown in commonly assigned U.S. Pat. Nos. 8,439,223 and 9,061,795. Sidewalls defining the shape of the outer container extend upwardly from the bottom to an open top.

The open top defines a neck for receiving additional components of the aerosol dispenser. The industry has generally settled upon a nominal neck diameter of 2.54 cm, for standardization of components among various manufacturers, although smaller diameters, such as 20 mm, are also used. Various neck shapes are shown in U.S. Pat. Nos. 6,019,252; 7,028,866; 7,279,207 and 7,303,087.

Typically a valve cup is inserted into the neck. The valve cup is sealed against the neck to prevent the escape of the propellant and loss of pressurization, such as described in U.S. Pat. Nos. 8,074,847; 8,096,327; 8,844,765; 8,869,842 and 9,505,509. The valve cup holds the valve components which are movable in relationship to the balance of the aerosol dispenser. Suitable valves are shown in commonly assigned U.S. Pat. Nos. 8,511,522 and 9,132,955. When the valves are opened, product may be dispensed through a nozzle, etc. as described in commonly assigned U.S. Pat. No. 9,174,229.

A valve may be inserted into the valve cup for selective actuation by the user. The valve is typically normally closed, and may be opened to create a flow path for the product to ambient or a target surface. The valve may be compatible with local recycling standards. Suitable valves are disclosed in commonly assigned U.S. Pat. Nos. 8,511,522 and 9,132,955.

If a valve is to be assembled into an aerosol, typically the valve cup is crimped onto the neck of the aerosol container. But this operation is expensive and is difficult to perform with a plastic valve cup. A separate interlock may be used to attach a valve to a valve cup, particularly a plastic valve 28 and plastic valve cup are used. Suitable interlocks include bayonet fittings and threads as disclosed in commonly assigned P&G Case 14458, Ser. No. 15/235,237, filed Aug. 12, 2016. A pressure vessel with a threaded bore is proposed in U.S. Pat. No. 8,505,762.

A bag may be used to contain product for selective dispensing by a user. Dispensing of product from the bag occurs in response to the user actuating the valve. The bag separates product within the bag from propellant disposed between the bag and container. This bag limits or even prevents intermixing of the contents of the bag and the components outside of the bag. Thus, product may be contained in the bag. Propellant may be disposed between the outside of the bag and the inside of the outer container. Upon actuation of the valve, a flow path out of the bag is created. This embodiment is commonly called a bag in can and may be used, for example, in dispensing shaving cream gels. Alternatively, a bag may be directly joined to the valve housing, in a configuration commonly called a bag on valve. A suitable bag configuration is disclosed in commonly assigned P&G Case 14458, Ser. No. 15/235,227, filed Aug. 12, 2016 which teaches attaching a bag to a valve cup.

If a bag configuration is desired, propellant may be disposed between the bag and outer container, as disclosed in U.S. Pat. No. 5,219,005 and in commonly assigned U.S. Pat. Nos. 8,631,632 and 8,869,842. Afterwards, product fill may occur in a separate, remote, operation, optionally carried out in another location, which may be in the same country or in a different country as disclosed in commonly assigned 2012/0291911. Such a manufacturing process can conserve costs in production, shipment and/or storage.

An aerosol container having a bag therein may be made from a dual layer preform, having plural layers disposed one inside the other. Relevant attempts include U.S. Pat. Nos. 3,450,254; 4,330,066; 6,254,820; RE 30093 E; WO 9108099 and US 2011/0248035 A1. But each of these attempts requires a separate operation to attach the bag to the relevant component. Each attachment step takes time in manufacturing and creates the opportunity for leakage if not correctly performed. Improvements in dual layer preforms are found in commonly assigned P&G Case 14461, application Ser. No. 15/235,279, filed Aug. 12, 2016.

Alternatively, a dip tube may be used if intermixing of the product and propellant is desired. When the user actuates the valve, the product and propellant are dispensed together through the dip tube. This embodiment may utilize a dip tube. The dip tube takes the product and propellant mixture from the bottom of the outer container. Or a piston may be used to expel product, particularly if highly viscous, as described in 2002/0027146, U.S. Pat. No. 6,375,045 and commonly assigned 2016/0368700.

Collectively, bags, dip tube, pistons and the associated hardware are referred to as product delivery devices. Various formats for the delivery devices may be required for different products, often complicating production. For example, one product may require a dip tube product delivery device in conjunction with a very small nozzle. The next aerosol dispenser on the production schedule may simply require changeout to a new, larger, nozzle.

But if the one wishes to manufacture multiple products, multiply different aerosol dispensers may be necessary. Different aerosol dispensers may require different valves. The valves may be attached to the outer containers by a fitting as disclosed in commonly assigned U.S. application Ser. No. 15/235,237, filed Aug. 12, 2016 under Case No. 14459. This arrangement allows different combinations of valves and outer containers to be mixed and matched as desired.

If the valve is threadedly attached to the outer container and the outer container is pressurized, it is important that the valve does not become dislodged allowing rapid and possibly catastrophic depressurization to occur. If the valve is not fully engaged, propellant pressure may expel the valve, creating a missile hazard or other safety concerns. Or a user may attempt disassembly and become injured. Regulations require aerosol dispenser to be permanently sealed.

Thus it is important the valve does not become unthreaded and lead to a missile hazard or catastrophic failure. One attempt to prevent reverse rotation is shown in U.S. Pat. No. 4,323,203. But this attempt relies upon a selection switch to selectively provide for reverse rotation and is infeasible for the present invention. Tamper evident bands have been used in the beverage industry. But these attempts also allow for reverse rotation, and are likewise infeasible for the present invention.

Accordingly, this invention is directed to the problem of how to provide a preform for an outer container of an aerosol dispense and being usable to prevent a complementary threaded valve from becoming detached from the aerosol dispenser.

SUMMARY OF THE INVENTION

In one embodiment, the invention comprises a preform suitable for blow molding into for an outer container usable for a pressurized aerosol dispenser. The preform has a longitudinal axis and comprises a closed end bottom, an open neck longitudinally opposed thereto, the open neck having a periphery and threads for accepting a valve having complementary threads; and at least one pawl or ratchet operatively juxtaposed with the periphery of the preform. The at least one pawl or ratchet allows onward rotation of a complementary valve in an onward direction, and preventing detachment of the valve therefrom in a reverse rotation direction.

It is to be understood that any preform described and claimed herein can be blow molded into a corresponding outer container, and any outer container described herein can be blow molded from a corresponding preform.

BRIEF DESCRIPTION OF THE DRAWINGS

The drawings are to scale, unless otherwise noted as schematic. The onward direction is clockwise in the drawings unless otherwise stated.

DETAILED DESCRIPTION OF THE INVENTION

Figure 1:
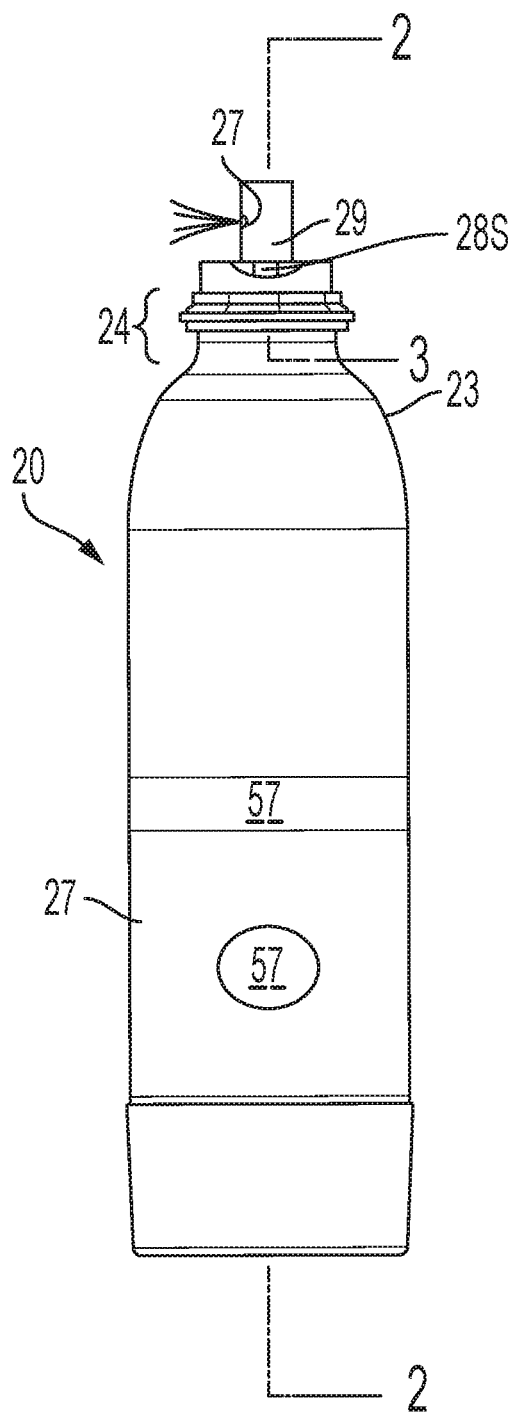
FIG. 1 is a side elevational view of an aerosol dispenser according to the present invention, schematically showing a spray being dispensed.
Figure 2:
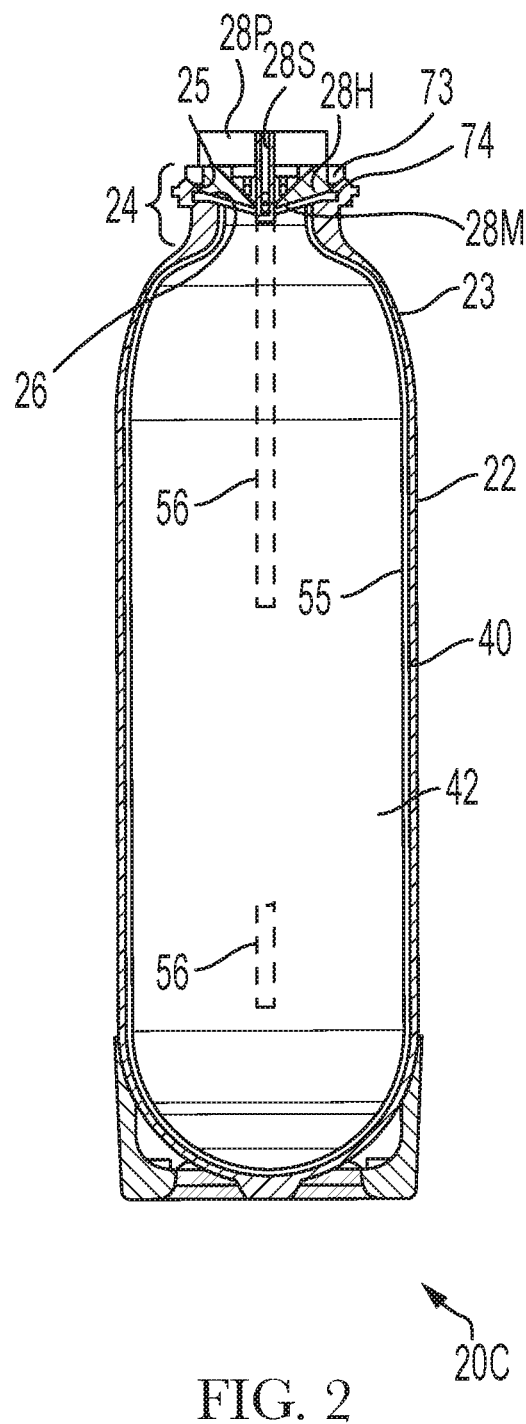
FIG. 2 is a vertical sectional view of an aerosol container, taken along lines 2-2 of FIG. 1, the actuator being removed for clarity.
Figure 3D:
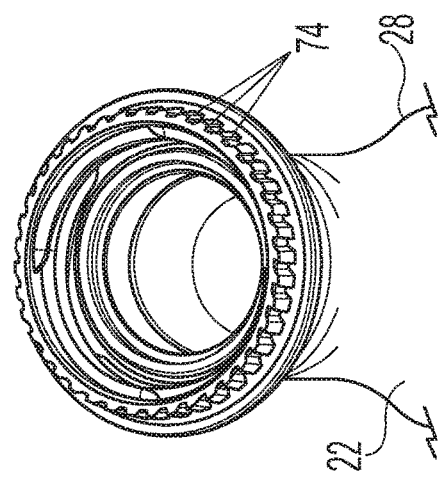
FIG. 3D is a fragmentary a perspective view of a preform suitable to make the outer container of FIGS. 3A and 3B.
Figure 3B:
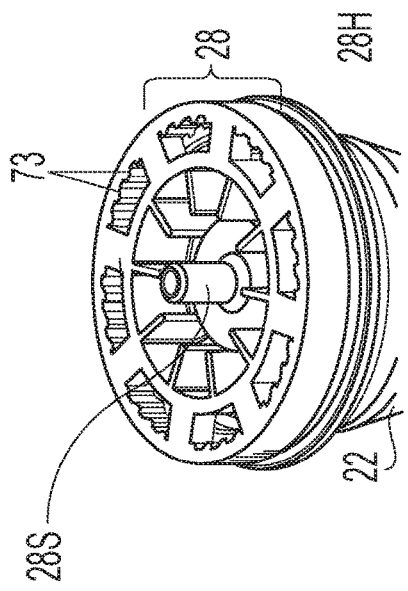
FIG. 3B is a fragmentary top perspective view of the outer container and valve of FIG. 3A in an assembled condition.
Figure 3C:
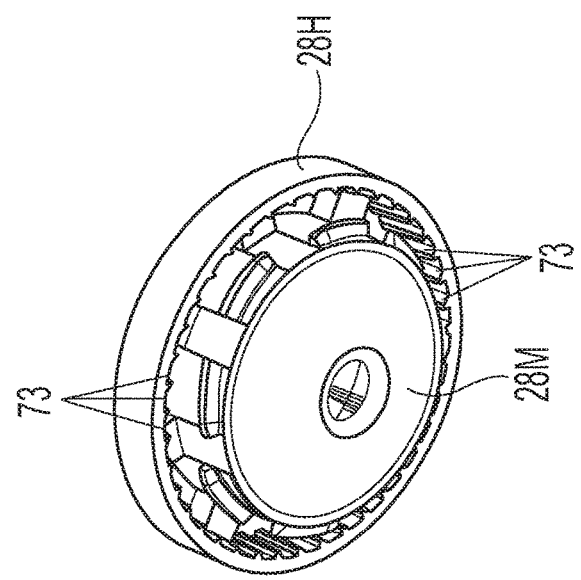
FIG. 3C is a bottom perspective view of the valve housing and moving assembly of the valve in FIGS. 3A and 3B.
Figure 3A:
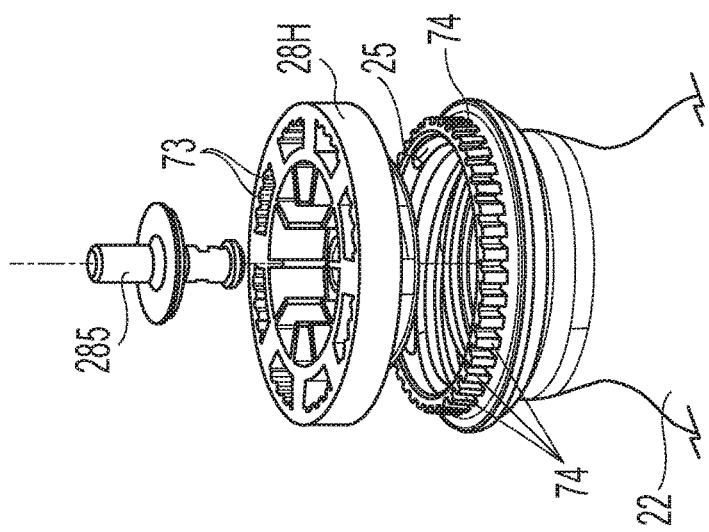
FIG. 3A is an exploded, fragmentary perspective view of an outer container having radially outwardly extending pawls and a complementary valve and valve stem, the valve having radially inwardly extending ratchets.
Figure 3E:
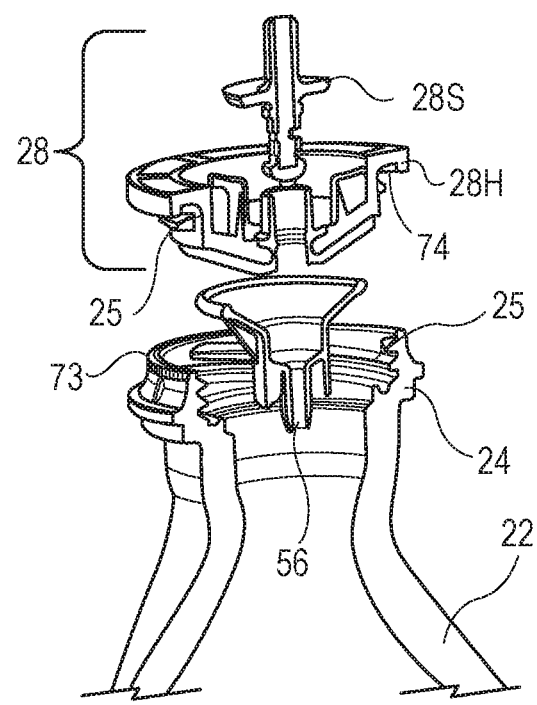
FIG. 3E is an exploded, fragmentary, perspective, sectional view of a prefrom having radially outwardly extending pawls and a complementary valve and valve stem, and a dip tube, the valve having radially inwardly extending ratchets.

Referring to FIGS. 1 and 2, an aerosol dispenser 20 and aerosol container 20C, each having a longitudinal axis, are shown, respectively. The aerosol dispenser 20 comprises a pressurizeable outer container 22 usable for such an aerosol dispenser 20. The outer container 22 has a neck 24 into which a valve cup 26 is sealingly disposed. A valve 28 and actuator 29 may be disposed in the valve cup 26 for selective dispensing of product 42 from the aerosol dispenser 20. A seal 30 having a surface for sealing a valve 28 to the valve cup 26 may be disposed below the valve cup 26 and valve 28 to prevent escape of product 42 to ambient. As used herein, an aerosol container 20C may be a subset of an aerosol dispenser 20, and have an outer container 22, valve cup 26 sealed thereto with a bag 55/dip tube 56, collectively referred to as a product delivery device 55, 56, joined to the valve cup 26, and optionally propellant 40, but not necessarily a valve 28, actuator 29, labeling, etc. Optionally the valve 28 may be directly joined to the outer container without a separate valve cup 26.

As used herein, the top of the aerosol dispenser 20 or the outer container 22 is taken as the uppermost part, when the aerosol dispenser 20 or container 22 is vertically oriented in its normal use or storage position. As used herein, the bottom of the aerosol dispenser 20 or the outer container 22 is taken as the lowermost part, when the aerosol dispenser 20 or the container 22 is vertically oriented in its normal use or storage position. The top and bottom are longitudinally opposed, with the top typically being open at a neck 24 and bottom typically being a closed end. The terms 'above' and 'below' refer to relative positions towards and away from the top, respectively. Likewise the terms 'above' and 'below' refer to relative positions away from and towards the bottom, respectively.

The aerosol dispenser 20 and outer container 22 have a longitudinal axis, defining the main axis. The aerosol dispenser 20 and outer container 22 may be longitudinally elongate, i.e. having an aspect ratio of longitudinal dimension to transverse dimension[s] such as diameter greater than 1, an aspect ratio equal to 1 as in a sphere or shorter cylinder, or an aspect ratio less than 1.

The outer container 22 may comprise metal or preferably plastic, as are known in the art. The plastic may be polymeric, and particularly comprise polyethylene terephthalate (PET) or polypropylene (PP) for all of the components described herein. The outer container 22 may be injection molded or further blow molded in an ISBM process, as well known in the art. The outer container 22 defines a longitudinal axis and may have an opening at one end thereof. The opening is typically at the top of the pressurizeable container when the pressurizeable container is in its-in use position.

As the top of the outer container 22 is approached, the outer container 22 may have a neck 24. The opening defines a neck 24, to which other components may be sealingly joined. The neck 24 may be connected to the container sidewall by a shoulder 23. The shoulder 23 may more particularly be joined to the sidewall by a radius. The shoulder 23 may have an annular flat. The neck 24 may have a greater thickness at the top of the outer container 22 than at lower portions of the neck 24 to provide a differential thickness. Such differential thickness may be accomplished through having an internally stepped neck 24 thickness.

A normally closed valve 28 may be disposed in the neck 24. The valve 28 is openable upon demand by a user, in response to manual operation of an actuator 29. The actuator 29 may be depressable, operable as a trigger, etc. to spray product 42 from the aerosol dispenser 20. Illustrative and non-limiting products 42 include shave cream, shave foam, body sprays, body washes, perfumes, cleansers, air treatments, astringents, foods, paint, insecticides, etc.

The valve 28 or valve cup 26 may be sealed to the neck 24 of the outer container 22 using class 1 TPE material. Polyester based TPE sold by Kraiburg TPE GmbH & Co KG of Waldkraiburg, Germany under the name HTC8791-52 and sold by DuPont of Delaware under the name HYTEL may be used for good resistance to Silicone and adhesion to PET. Such a TPE material is believed to fall under Resin Identification Code 1/01 for PETE/PET, as set forth above by the Society of Plastics Industry and ASTM D7611. Or a Styrenic bloc copolymer based TPE such as Kraiburg HTC8791-24 or Krayton elastomer may be used, providing easier process and lower density. Other seal materials include silicone, rubber and similar conformable materials.

If desired, the valve 28 may be sealed to the outer container 22 utilizing a fitting. The fitting may be a threaded fitting, particularly a helical threaded fitting, a bayonet fitting, etc. The fitting may allow for engagement of the valve cup 26 with the neck 24 of the container 22 to occur in either the clockwise direction or the counterclockwise direction.

A valve 28, in turn, may be disposed within the valve cup 26. The valve 28 provides for retention of product 42 within the aerosol dispenser 20 until the product 42 is selectively dispensed by a user. The valve 28 may be selectively actuated by an actuator 29. A nozzle 27 and related valve 28 components may optionally be included, depending upon the desired dispensing and spray characteristics. The valve 28 may be attached using conventional and known means. The valve 28 and actuator 29 may be conventional and do not form part of the claimed invention, except as provided herein.

The valve 28 and valve cup 26 may be integral and formed by a single injection molding operation. Or the valve 28 and valve cup 26 may be joined using known means. The valve 28 may be a normally closed valve 28. A normally closed valve 28 is closed in its rest position. The valve 28 is only opened when actuated upon demand by a user.

The components of the valve 28 may be joined to a common valve housing 28H. The housing 28H acts as a chassis for the other valve components and joins the valve 28 to the neck 24 of the outer container 22 or preform 60. A valve stem 28S provides a product 42 flow path and joins the actuator 29 to the valve 28 in fluid communication. The valve stem 28S may be disposed within and cause responsive movement in the moving assembly 28M. The valve stem 28S has a valve stem distal end, taken as the uppermost portion of the valve stem 28S without an actuator 29 or other attachment. The valve 28 may have blades 28B, to allow for a chuck to rotationally attach the valve 28.

The valve 28 may be externally helically threaded or internally helically threaded. The threads 25 may or may not circumscribe the neck 24, as desired. One or more threads 25 may be utilized, with four threads 25, each thread 25 subtending about 90 degrees having been found suitable. The valve 28 is assembled by screwing onto the complementary threads 25. The assembly of the valve 28 onto outer container 22 is intended to be permanent.

Selective actuation of the valve 28 allows the user to dispense a desired quantity of the product 42 on demand. Illustrative and non-limiting products 42 include shave cream, shave foam, body sprays, body washes, perfumes, cleansers, air fresheners, astringents, foods, paint, etc.

The product delivery device 55, 56 may be used to contain and/or provide for delivery of product 42 from the aerosol dispenser 20 upon demand. Suitable product delivery devices 55, 56 comprise pistons, bags 55, dip tubes 56 (as shown in phantom), and do not form part of the claimed invention, except as specifically claimed herein. If desired, the product delivery device 55, 56 may further comprise a metering device for dispensing pre-determined, metered quantities of product 42, as described in U.S. Pat. Nos. 2,815,889; 4,142,652 and 5,421,492. The product delivery device 55, 56 may also comprise an inverting valve having a ball therein to alter product 42 flowpath.

If desired the product delivery device 55, 56 may comprise a dip tube 56 disposed in a bag 55. Such a dip tube 56 may reach to nearly the bottom of the bag 55, or be juxtaposed near the middle of the bag 55. A dip tube may be made according to U.S. Pat. No. 8,091,741.

The bag 55 may be directly attached to the valve cup 26. Particularly, bag 55 may be integrally injection molded with the valve cup 26. If the preform 60 is to be stretched into a bag 55, the preform 60 may have a wall thickness of 1 to 3 mm. The resulting bag 55 is collapsible upon depletion of product 42 therefrom. The resulting bag 55 may have a thickness of 0.07 to 0.2 mm.

One of skill will recognize the preform 60 may be used to make the outer container 22 or a bag 55 for use with the aerosol container 20 of this invention. One of skill will recognize a bag 55 is commonly used to contain product 42 and keep such product 42 isolated from the propellant 40.

The pressurizeable container may further include a propellant 40. The propellant 40 may comprise hydrocarbons, nitrogen, air and mixtures thereof. Nonflammable propellant 40 listed in the US Federal Register 49 CFR 173.115, Class 2, Division 2.2 are also considered acceptable. The propellant 40 may particularly comprise a Trans-1,3,3,3-tetrafluoroprop-1-ene, and optionally a CAS number 1645-83-6 gas. One such propellant 40 is commercially available from Honeywell International of Morristown, N.J. under the trade name HFO-1234ze or SOLSTICE.

If desired, the propellant 40 may be condensable. Generally, the highest pressure occurs after the aerosol dispenser 20 is charged with product 42 but before the first dispensing of that product 42 by the user. A condensable propellant 40, when condensed, provides the benefit of a flatter depressurization curve at the vapor pressure, as product 42 is depleted during usage. A condensable propellant 40 also provides the benefit that a greater volume of gas may be placed into the container at a given pressure. A condensable propellant 40, such as HFO-1234ze, may be charged to a gage pressure of 100-400 kPa at 21 degrees C.

A manifold may supply propellant 40, under pressure, through at least one channel between the valve cup 26 and container neck 24. The manifold may be retractingly disposed above the container 22. The manifold may be brought into contact with the valve cup 26, forming a temporary seal therebetween. Suitable channels are particularly described in commonly assigned U.S. Pat. No. 8,869,842 to Smith at FIG. 8, column 7, lines 57 to column 8, line 2 and column 8, lines 44-60. While the temporary seal is established between the manifold and valve cup 26, the propellant 40 may be charged into the outer container 22.

The aerosol dispenser 20, as presented to a user may have an initial pressure. The initial pressure is the highest pressure encountered for a particular filling operation, and corresponds to no product 42 yet being dispensed from the product delivery device 55, 56. As product 42 is depleted, the outer container 22 approaches a final pressure. The final pressure corresponds to depletion of substantially all product 42, except for small residual, from the product delivery device 55, 56. One benefit of the invention is that the residual product 42, remaining at end of life, is unexpectedly minimized.

This arrangement provides the benefit that propellant 40 may be charged to a lesser pressure than the desired starting pressure, decreasing propellant 40 charge time and reducing pressure applied to the charging machinery. Another benefit is that propellant 40 is disposed as needed for the end use when the aerosol dispenser 20 is ready for sale, product 42 fill and upon product 42 depletion may be recharged with product 42 and reused.

At 21 degrees C., the outer container 22 may be pressurized to an internal gage pressure of 100 to 1300, 110 to 490 or 270 to 420 kPa. A particular aerosol dispenser 20 may have an initial propellant 40 pressure of 1100 kPA and a final propellant 40 pressure of 120 kPa, an initial propellant 40 pressure of 900 kPA and a final propellant 40 pressure of 300 kPa, an initial propellant 40 pressure of 500 kPA and a final propellant 40 pressure of 0 kPa, and any values therebetween.

If desired, the outer container 22, valve cup 26, valve 28, and/or piston may be polymeric. By polymeric it is meant that the component is formed of a material which is plastic, comprises polymers, and/or particularly polyolefin, polyester or nylons, and more particularly PET. Thus, the entire aerosol dispenser 20 or, specific components thereof, may be free of metal, allowing microwaving. Microwave heating of the aerosol dispenser 20 or pressurizable container therefor provides for heating of the product 42 prior to dispensing. Heating of the product 42 prior to dispensing may be desirable if the product 42 is applied to the skin, becomes more efficacious at lower viscosities, or is to be eaten.

The outer container 22, and all other components, optionally excepting the TPE seal, may comprise, consist essentially of or consist of PET, PEN, Nylon, EVOH or blends thereof to meet DOT SP 14223. All such materials may be selected from a single class of recyclable materials, as set forth above by the Society of Plastics Industry and ASTM D7611. Particularly all components of the aerosol dispenser 20 may comprise the aforementioned TPE and PET/PETE, Resin Identification Code 1/01. This material selection provides the benefit that the entire aerosol dispenser may advantageously be recycled in a single stream.

Alternatively, the valve cup 26 and/or bag 55 may comprise plural layers such as nylon with EVOH, PET and/or polyolefin materials. Three layers may be utilized, such as PET/Nylon/PET or PET/EVOH/PET. The layers may be co-molded or overmolded. The multi-layer arrangements may provide increased barrier resistance and reduced failure rates.

The outer container 22, and/optionally the product delivery device 55, 56, may be transparent or substantially transparent. This arrangement provides the benefit that the consumer knows when product 42 is nearing depletion and allows improved communication of product 42 attributes, such as color, viscosity, etc. Also, labeling or other decoration of the container may be more apparent if the background to which such decoration is applied is clear.

Suitable decoration includes labels 57. Labels 57 may be shrink wrapped, printed, etc., as are known in the art.

The outer container 22 may define a longitudinal axis of the aerosol dispenser 20. The outer container 22 may be axisymmetric as shown, or, may be eccentric. While a round cross-section is shown, the invention is not so limited. The cross-section may be square, elliptical, irregular, etc. Furthermore, the cross section may be generally constant as shown, or may be variable. If a variable cross-section is selected, the outer container 22 may be barrel shaped, hourglass shaped, or monotonically tapered.

The outer container 22 may range from 6 to 60 cm, and particularly 10 to 40 cm in height, taken in the axial direction and from 3 to 60 cm, and particularly 4 to 10 cm in diameter if a round footprint is selected. The outer container 22 may have a volume ranging from 40 to 1000 cc exclusive of any components therein, such as a product delivery device 55, 56. The outer container 22 may be injection stretch blow molded. If so, the injection stretch blow molding process may provide an overall stretch ratio of greater than 8, 8.5, 9, 9.5, 10, 12, 15 or 20 and less than 50, 40 or 30.

The outer container 22 may sit on a base. The base is disposed on the bottom of the outer container 22. Suitable bases include petaloid bases, champagne bases, hemispherical or other convex bases used in conjunction with a base cup. Or the outer container 22 may have a generally flat base with an optional punt.

Referring generally to FIGS. 3A-7 and examining the invention in more detail, the valve 28 and outer container 22, optionally particularly at the neck 24 thereof, have a complementary ratchet 73 and pawl 74 arrangement. As used herein a pawl 74 is an extending member, generally cantilevered and which can rotate with the valve 28, as it is threaded into place.

The pawl 74 may co-actingly intercept a complementary ratchet. As used herein a ratchet 73 is a member which intercepts a pawl, allowing the pawl 74 to move in a first direction, but not in a second, opposed direction.

A ratchet, and preferably a plurality of ratchets 73, may be disposed around the periphery of the neck 24. The ratchets 73 may be stationary relative to the neck 24 and not rotate as the valve 28 is threaded into place. More preferably, the ratchets 73 circumscribe the neck 24 of the outer container 22.

The ratchets 73 may comprise sprags, cams, and other structural features which allow only unidirectional rotational motion. The sawtooth ratchet 73 has two surfaces, a sloped onward surface and a generally perpendicular stop surface. The ratchet 73 may rise to a crest or to a flat, as desired. The pawls 74 and ratchets 73 may have different geometries, as shown or may have identical geometry. If the onward direction is clockwise, the reverse direction is counterclockwise and vice versa. Both clockwise and counterclockwise rotations are contemplated hereunder.

The cam surfaces allow movement in the onward direction, according to the incline of the sloped onward surfaces. The stop surface is generally perpendicular to the circumferential rotation direction, to impede rotational detachment and reverse movement of the valve 28. By impede it is meant that the valve 28 does not undergo reverse rotation, and possible loosening/disassembly from the neck 24, without undue and unintended torque applied thereto. Preferably the ratchets 73 and pawls 74 completely prevent discernable reverse rotation or subsequent disassembly of the valve 28. Tamper evident bands, which indicate a valve 28 or other component of the aerosol dispenser 20 has been removed are not within the scope of the claimed invention.

Either of the pawls 74 and ratchets 73 may be disposed on the valve 28, providing a complementary ratchet 73 or pawl 74 is disposed on the outer container 22. By complementary, it is meant the ratchets 73 and pawls 74 are sized to fit together, allowing movement in the onward direction, and preventing improper movement in the reverse direction. Also the ratchets 73 and pawls 74 are disposed on a nominally common, and preferably coincident, diameter.

Since the ratchets 73/pawls 74 do not allow for reverse rotation, but do allow for onward movement, no additional tooling is required in manufacture and the permanent threaded attachment of the valve 28 to the aerosol container 20C and ultimately the aerosol dispenser 20, and occurs automatically and without requiring an extra step during manufacture.

The disclosure is directed to equal numbers of plural ratchets 73 and pawls 74, equally spaced about the longitudinal axis, the invention is not so limited. The disclosure is also directed to unequal numbers of ratchets 73 and pawls 74, single ratchets 73, single pawls 74, unequally spaced ratchets 73 and/or unequally spaced pawls 74 are contemplated and within the scope of the present invention.

Referring particularly to FIGS. 3A-3E, the outer container may have radially outwardly extending pawls 74. A complementary valve housing 28H may radially inwardly extending ratchets 73, it being generally preferred that the ratchets 73/pawls 74 not be disposed on the moving assembly 28M to prevent inadvertent dislodgement during operation of the valve 28. Preferably the valve 28 is threaded into the neck 24 of the outer container 22, to provide a smaller effective diameter. The pawls 74 engage the ratchets 73 upon threaded assembly of the valve 28 to the neck 24 of the outer container 22.

The ratchets 73/pawls 74 may be generally equally spaced and equal in number in number. If the ratchets 73/pawls 74 are relatively small, so that e.g. at least 20, and preferably at least 30, ratchets 73/pawls 74 are spaced about the circumference of a commonly sized neck 24 of an aerosol dispenser 20, this arrangement provides the benefit that greater precision and torque control are achievable as the valve 28 is threaded onto the outer container 22.

A geometry having radially extending ratchets 73/pawls 74 provides the benefit that increased torque occurs during attempted reverse rotation of the valve. The increased torque provides increased resistance to undesired removal of the valve 28.

Figure 4A:
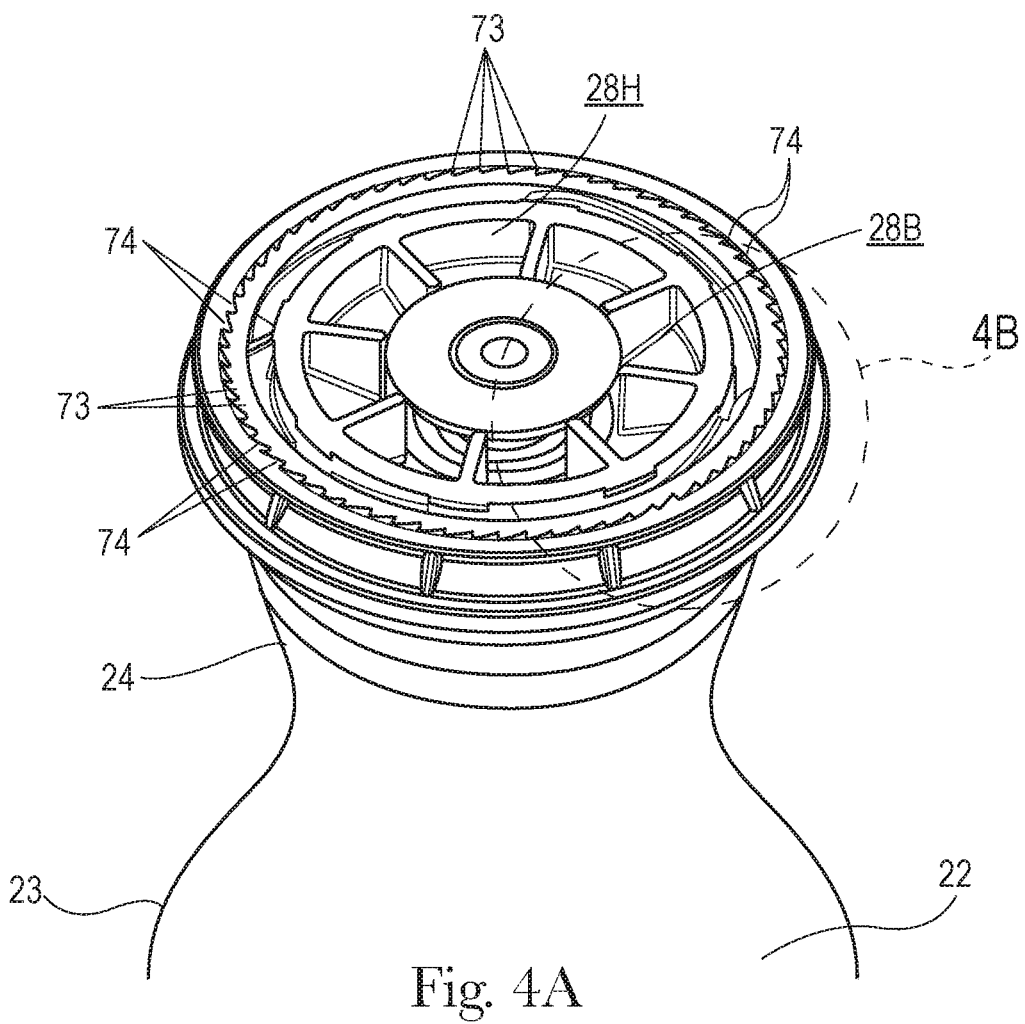
FIG. 4A is a fragmentary, perspective view of a valve having radially outwardly extending ratchets and an outer container having matched radially inwardly extending pawls, the pawls being disposed in pairs, in an assembled condition.
Figure 4B:
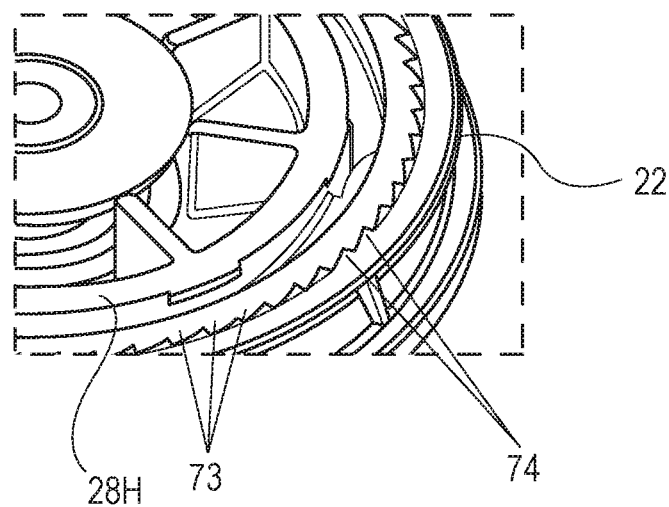
FIG. 4B is an enlarged, fragmentary, perspective view of the outer container and valve of FIG. 4A.
Figure 5D:
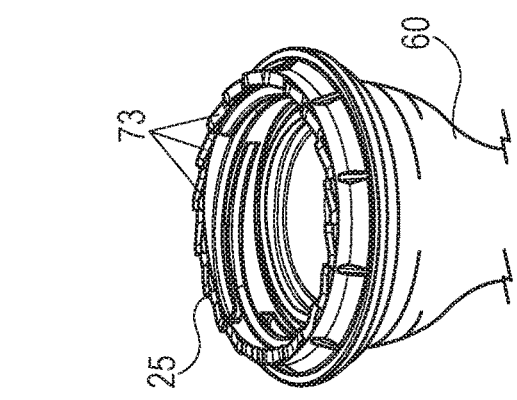
FIG. 5D is a fragmentary, perspective view of a preform suitable for use as an outer container of FIGS. 5A and 5B, and having a counterclockwise onward direction.
Figure 5E:
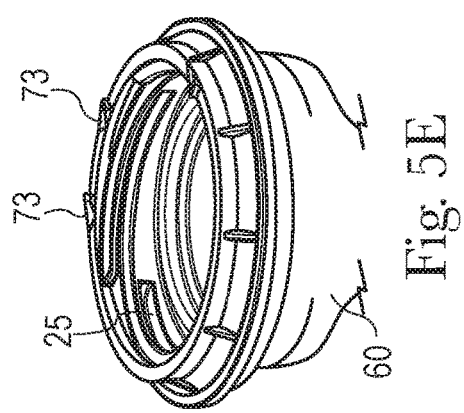
FIG. 5E is a fragmentary, perspective view of a preform suitable for use as an outer container of FIGS. 5A, 5B and 5C, and having three irregularly circumferentially spaced ratchets.
Figure 5B:
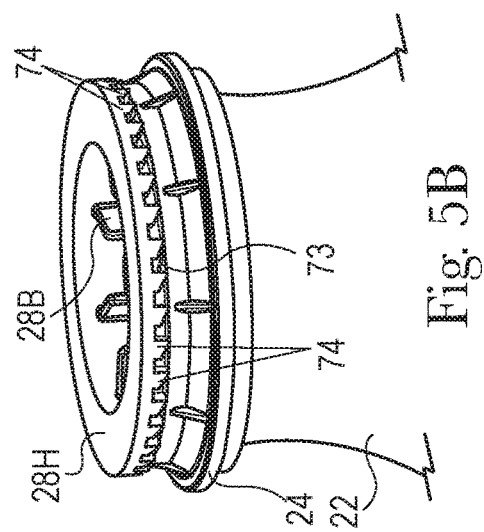
FIG. 5B is a fragmentary, perspective view of the outer container and valve similar to FIG. 5A in an assembled condition, the outer container having a single longitudinally upwardly extending ratchet.
Figure 5C:
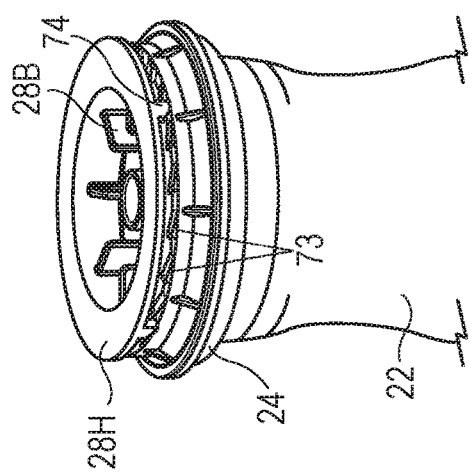
FIG. 5C is a fragmentary, perspective view of a preform having longitudinally upwardly extending ratchets and valve housing having two longitudinally, downwardly extending, irregularly circumferentially spaced, pawls, in an assembled condition, the assembly having more ratchets than pawls.
Figure 5A:
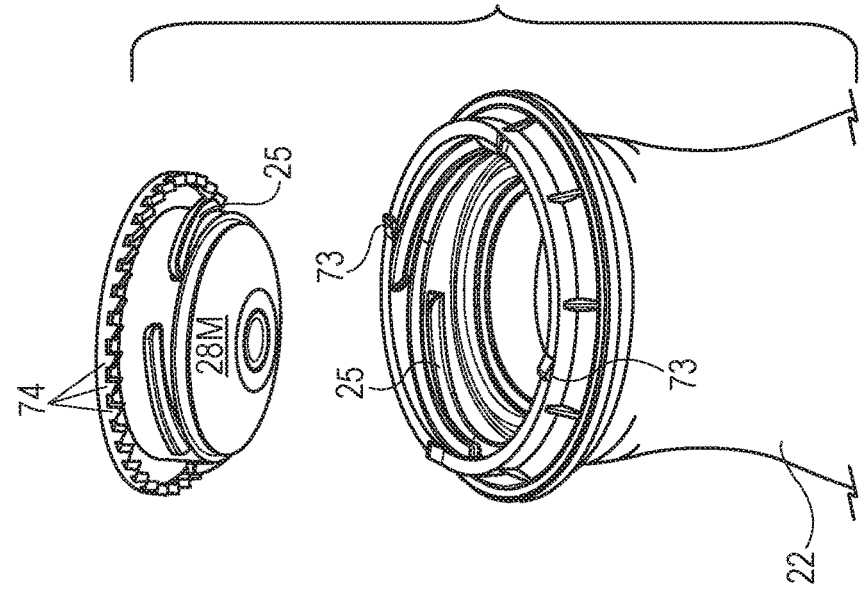
FIG. 5A is a fragmentary, exploded, perspective view of a valve having longitudinally downwardly extending pawls and an outer container having longitudinally upwardly extending ratchets, the assembly having more pawls than ratchets, the valve stem being omitted for clarity.
Figure 5F:
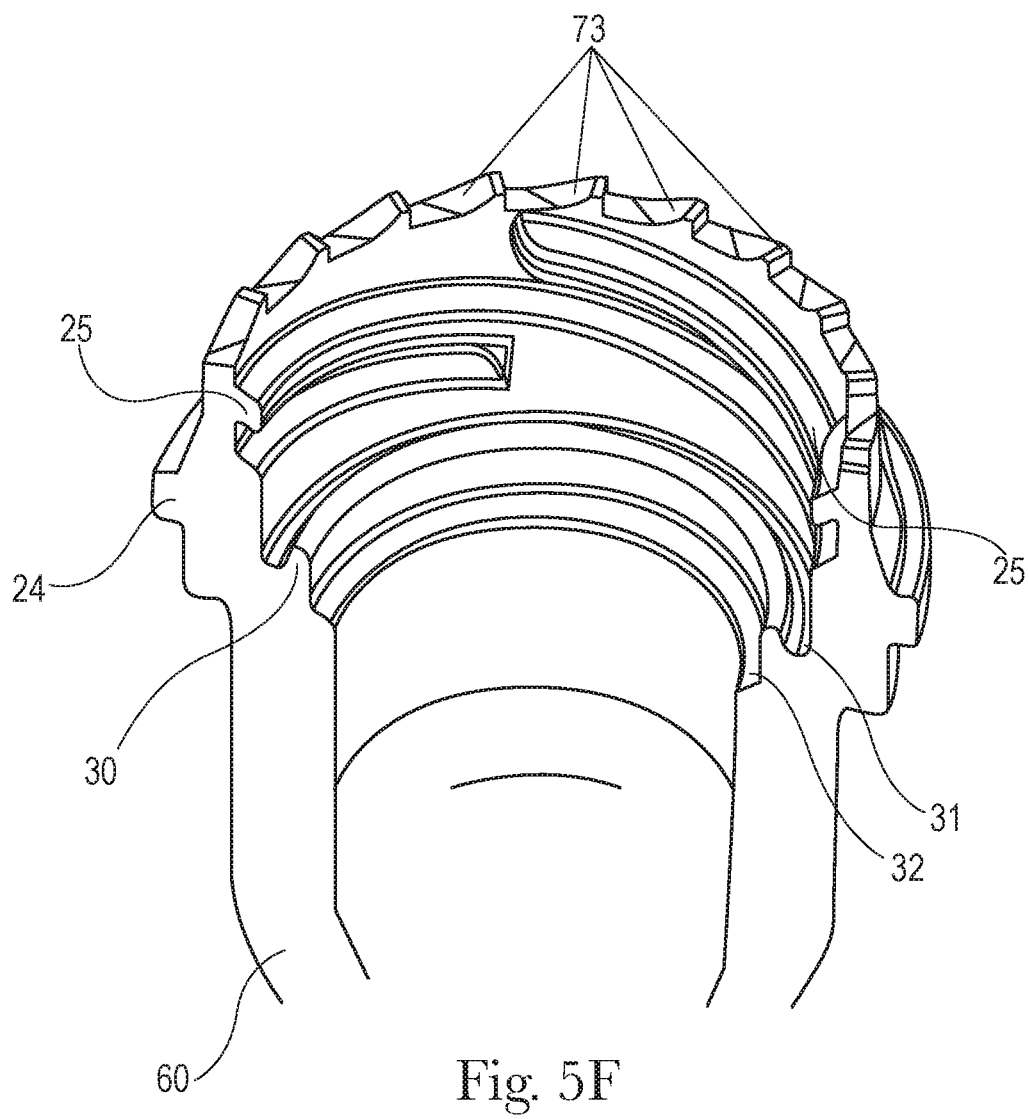
FIG. 5F is a fragmentary, perspective, sectional view of a preform suitable for use as the outer container of FIGS. 5A and 5B, and having plural equally circumferentially spaced ratchets circumscribing the preform.
Figure 6B:
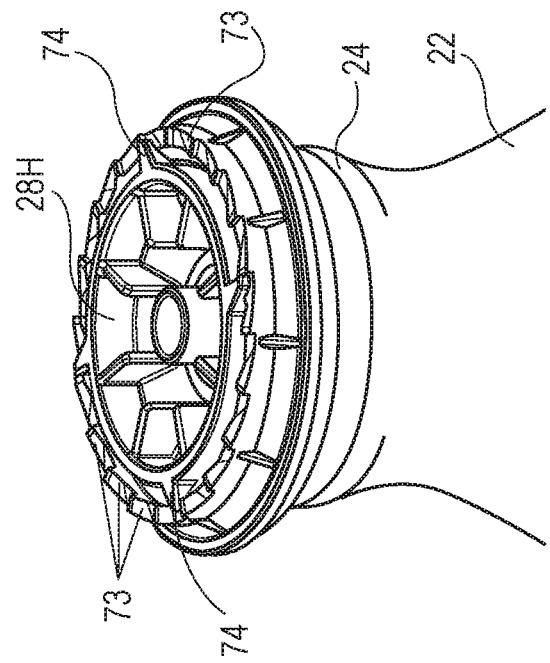
FIG. 6B is a fragmentary, perspective view of the outer container and valve housing of FIG. 6A in an assembled condition.
Figure 6A:
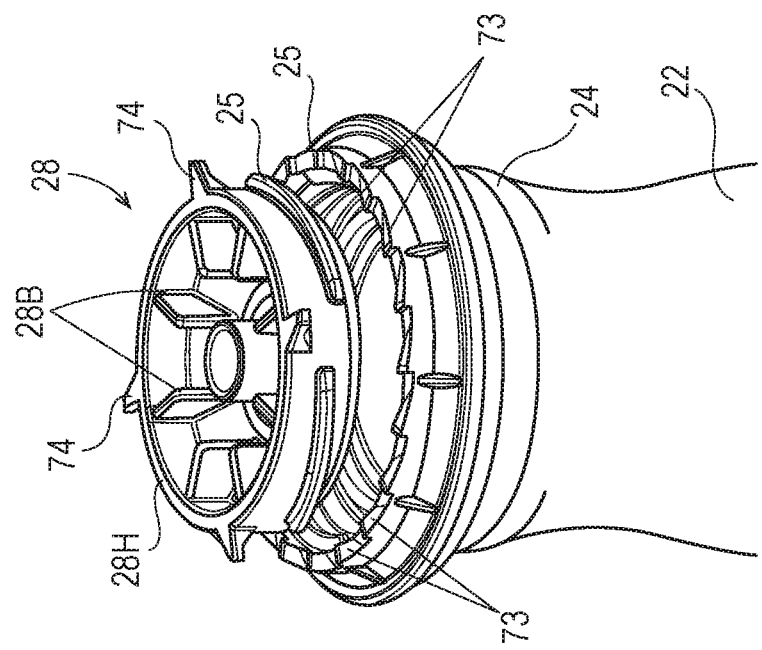
FIG. 6A is a fragmentary, exploded, perspective view of a valve housing having radially outwardly extending pawls and an outer container having longitudinally upwardly extending ratchets, the assembly having more ratchets than pawls.
Figure 6C:
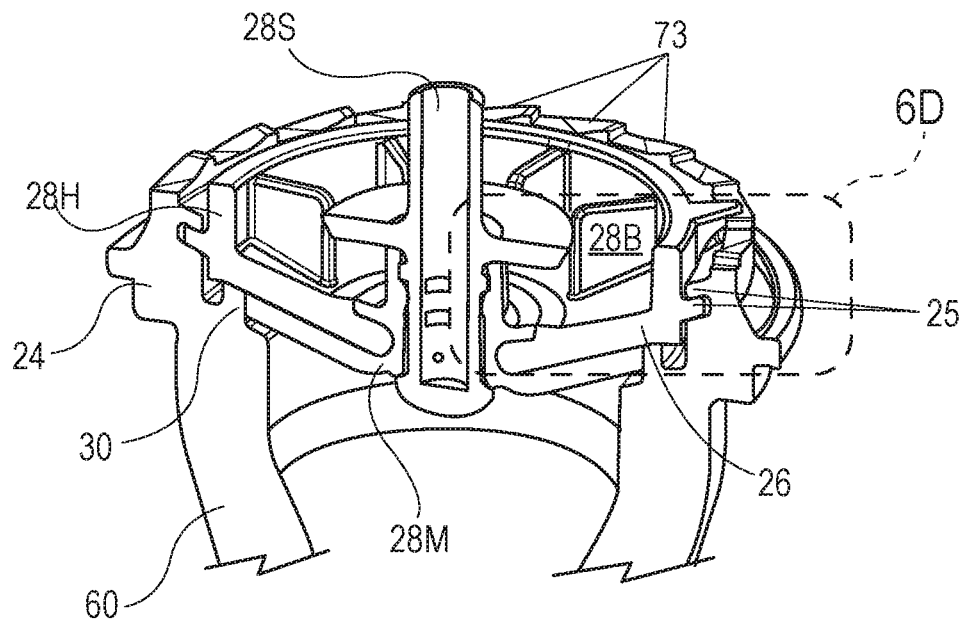
FIG. 6C is a fragmentary, perspective sectional view of a valve having radially outwardly extending pawls as assembled on a preform having longitudinally upwardly extending ratchets, the assembly having more ratchets than pawls.
Figure 6D:
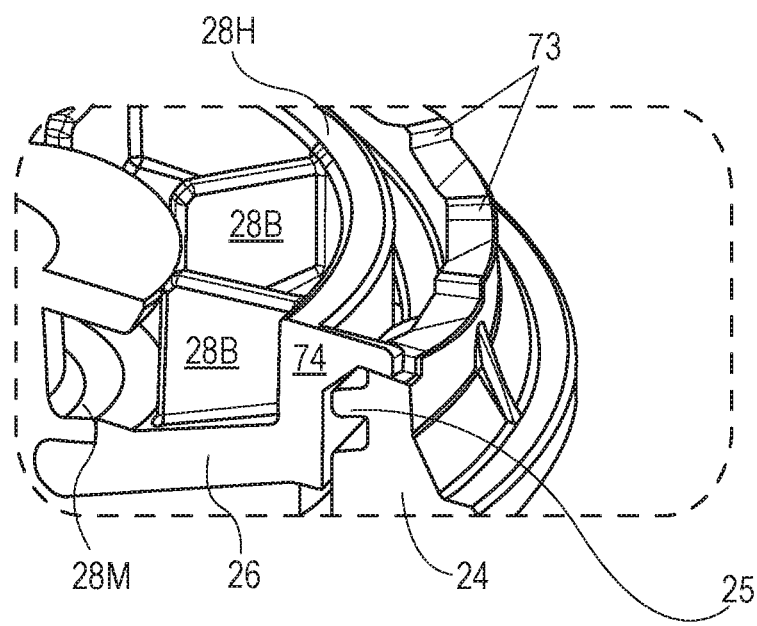
FIG. 6D is a fragmentary, enlarged view of the valve and preform of FIG. 6C.

Referring particularly to FIGS. 4A-4B, conversely, the valve 28 may have radially outwardly extending ratchets 73 and an outer container 22 may have radially inwardly extending pawls 74. In a degenerate case, the ratchets 73 and pawls 74 may be identical in geometry, as shown in FIGS. 4A-4B having sawtooth ratchets 73 and pawls 74. This embodiment provides the benefit that the ratchets 73 and pawls 74 are identical and interchangeable.

The ratchets 73/pawls 74 may be generally unequally spaced and/or unequal in number in number. This arrangement provides the benefit of conserving material at constant valve housing 28 diameter Thus, either of the pawls 74 or ratchets 73 may be disposed on the outer container 22. Again, the pawl 74 or ratchet 73 disposed on the outer container 22 may be integrally molded with the preform 60 used to make the outer container 22.

The other of the ratchets 73 and pawls 74 may be co-actingly disposed on the valve 28. This radial geometry provides the benefit of increased torque between the ratchets 73 and pawls 74 as the valve 28 is further threaded onto the outer container 22.

Referring to FIGS. 5A-5F, the pawls 74 and ratchets 73 may predominantly extend in the longitudinal direction and in a degenerate case may be parallel to the longitudinal axis. One of the pawls 74 and ratchets 73 may be disposed on the outer container 22. If desired, the pawl 74 or ratchet 73 disposed on the outer container 22 may be integrally molded with the preform 60 used to make the outer container 22.

The other of the ratchets 73 and pawls 74 may be co-actingly disposed on the valve 28. This geometry provides the benefit of increased engagement between the ratchets 73 and pawls 74 as the valve 28 is further threaded onto the outer container 22. This embodiment provides the benefit of confining the ratchet 73 and pawl 74 configuration to a more compact footprint and diameter within the aerosol dispenser 20.

Referring to FIGS. 6A-6D, a hybrid embodiment may be utilized. The hybrid embodiment has longitudinally extending ratchets 73 and radially extending pawls 74, or vice versa. The ratchets 73/pawls 74 may be disposed on the preform 60 and, upon blowmolding, are disposed on the outer container 22. The pawls 74 may extend radially inwardly or radially outwardly, as sized to intercept the ratchets 73. The ratchets 73 may extend longitudinally upwardly, to automatically engage the pawls 74 as the valve 28 is threaded onto the outer container 22.

A valve housing 28H having radially outwardly extending pawls 74 and an outer container 22 having longitudinally upwardly extending ratchets 73 is shown. One of skill will understand, that, like the previous embodiments, the disposition of the ratchets 73 and pawls 74 may be transposed so that the ratchets 73 are on the valve 28 and the pawls 74 are on the outer container 22. Or the outer container 24 may have radial ratchets 73/pawls 74 while the valve 28 has longitudinal and complementary pawls 74/ratchets 73.

Again, the pawls 74 may be disposed on the valve 28 and the ratchets 73 disposed on the preform 60, which upon blowmolding, are disposed on the outer container 22. The hybrid embodiment provides the benefit that high torque can be utilized.

Figure 7:
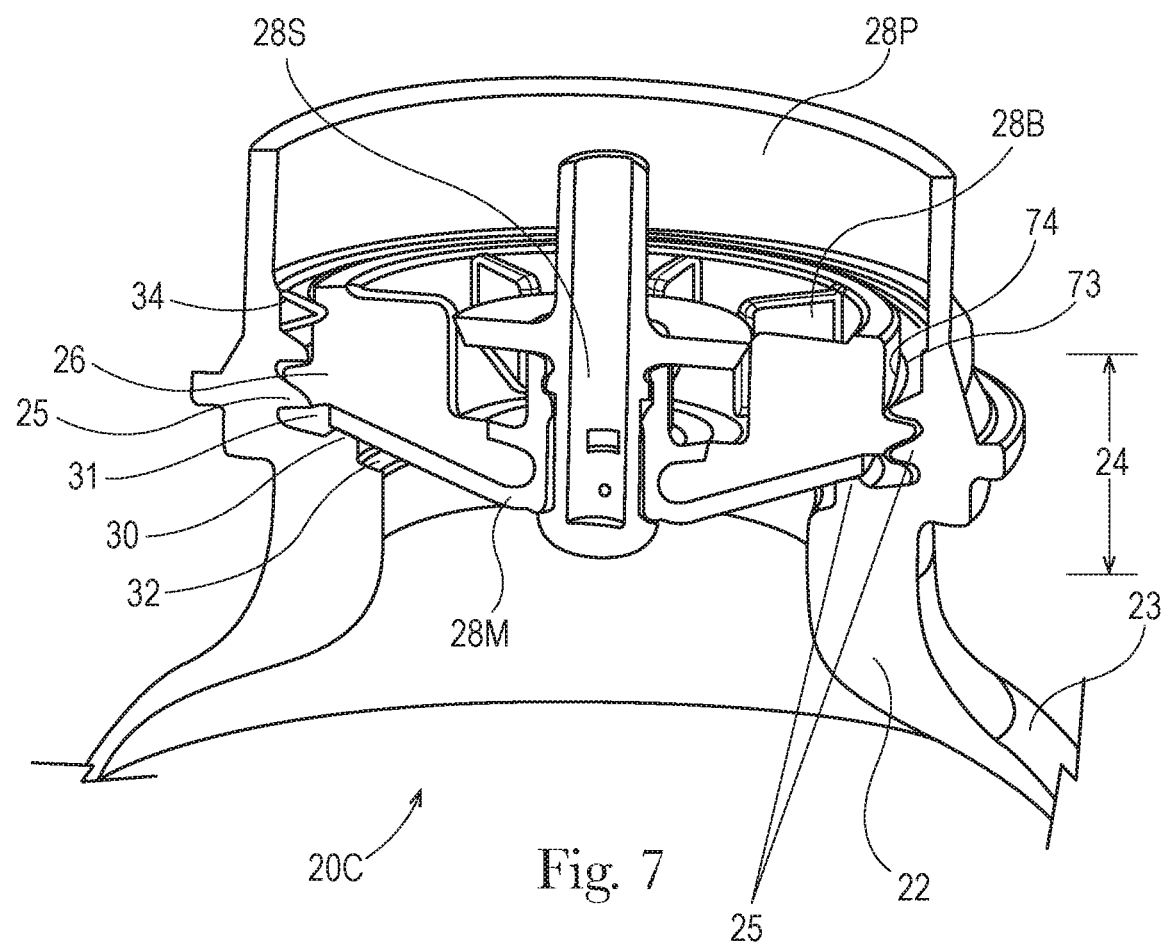
FIG. 7 is a fragmentary, perspective, sectional view of a preform having an optional sheath with radially inwardly extending pawls as assembled on a valve having complementary ratchets.

Referring to FIG. 7, the valve 28 may have an optional sheath 28P to protect valve stem 28S. The valve 28 may have one or more optional blades 28B to assist in fitting the valve 28 into the neck 24 of the outer container 22 and within the sheath 28S. One or more pawls 74 may extend inwardly from the sheath 28S. The pawls 74 may intercept a groove on the outside of the valve 28. The groove may have one or more complementary ratchets 73 therein, which intercept the inwardly extending pawls 74 to allow onward rotation but not reverse rotation. This embodiment provides the benefit that both anti-rotation capability and protection of the valve stem 28S by the sheath 28P can be incorporated into a single assembly. Again, the ratchets 73 and pawls 74 may be transposed so that either is disposed on the sheath 28P.

Figure 8:
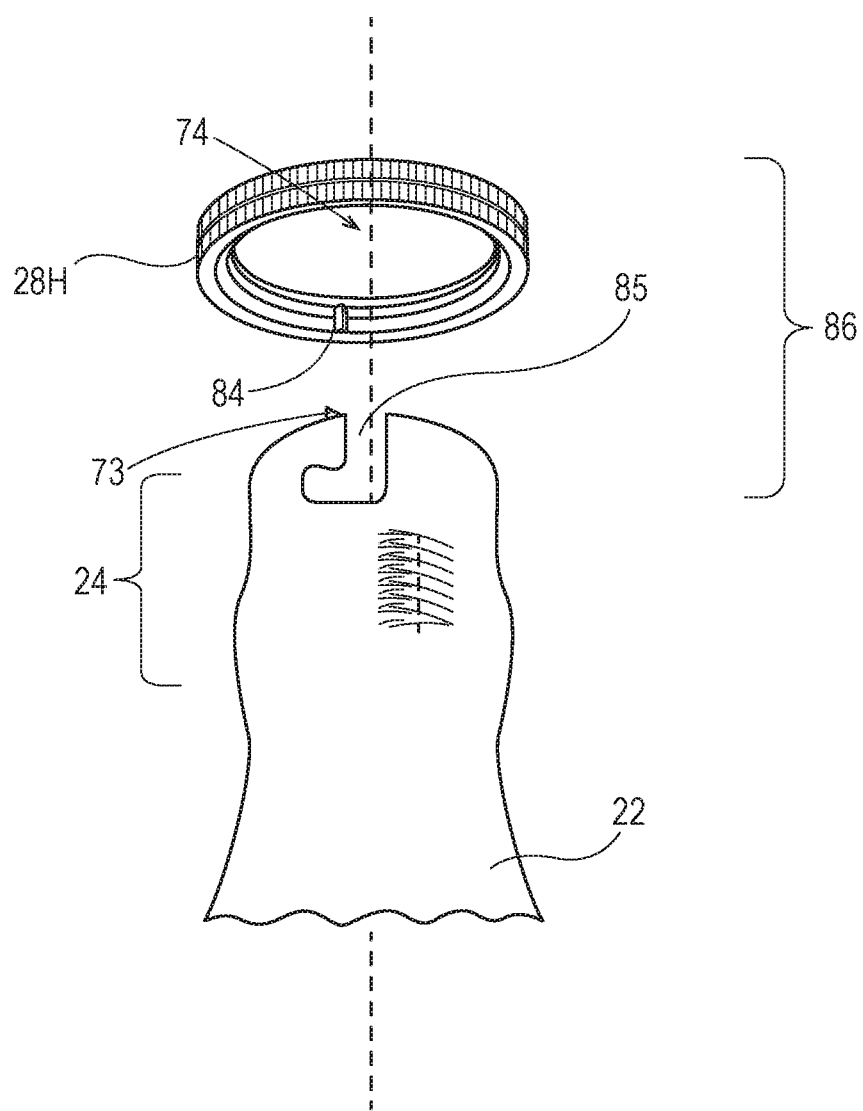
FIG. 8 is a schematic fragmentary exploded perspective view of a preform and valve housing having a bayonet fitting.

Referring to FIG. 8, a threaded fitting is not limited to the aforementioned helically threaded configurations. A threaded fitting may also include a bayonet fitting 86. A bayonet fitting 86 may have a projection 84 and complementary slot 85. The projection 84 is threaded into in the slot 85, preferably with a combination of axial and rotational circumferential motions. The bayonet fitting 86 holds the valve 28 to the neck 24 of the outer container 22. The slot 85 may be on the outer container 22 and projection 85 on the valve 28, or vice versa. Any of the aforementioned arrangements, dispositions and combinations of ratchets 73/pawls 74 may be used with the bayonet fitting 86 configuration.

Generally, it is to be understood that a single ratchet 73 and single pawl 74 may be suitable for any of the embodiments described herein. Plural ratchets 73 and plural pawls 74 are preferred to provide load sharing when torque in the reverse direction is applied. The ratchets 73 and pawls 74 are preferably equally circumferentially spaced, to further equalize torque about the longitudinal axis. The ratchets 73 may be mutually equally sized and shaped or be mutually unequally sized and shaped. Likewise, the pawls 74 may be mutually equally sized and shaped or be mutually unequally sized and shaped, so long as they co-act with the ratchets 73, as described herein. While the invention has been described in terms of threaded attachment, the invention is not so limited. A valve 28 having a bayonet fitting may be used with the ratchets 73 and pawls 74 described herein, to prevent undesired removal of such a valve 28. The fitting 25 may allow for engagement of the valve cup 26 with the neck 24 of the container 22 to occur in either the clockwise direction or the counterclockwise direction. The invention may comprise ratchets 73 and pawls 74 disposed on a common diameter or disposed on different, plural diameters. The ratchets 73 and pawls 74 need not extend identically radially or identically longitudinal. Prophetically, diagonal orientations are suitable, so long as the ratchets 73 and pawls 74 are complementary and co-act as described above.

The invention may be made according to any of the following non-limiting combinations.

- A. A preform suitable for blow molding into for an outer container usable for a pressurized aerosol dispenser, said preform having a longitudinal axis and comprising:
  a closed end bottom;
  an open neck longitudinally opposed thereto, said open neck having a periphery and threads for accepting a valve having complementary threads; and
  at least one pawl or ratchet operatively juxtaposed with said periphery of said preform, said at least one pawl or ratchet allowing onward rotation of a complementary valve in an onward direction, and preventing detachment of said valve therefrom in a reverse rotation direction.
- B. A preform according to paragraph A wherein said at least one pawl or ratchet comprises plural pawls or ratchets equally circumferentially spaced about said periphery of said neck.
- C. A preform according to paragraphs A and B wherein said at least one pawl or ratchet comprises plural ratchets equally circumferentially spaced about and circumscribing said periphery of said neck.
- D. A preform according to paragraphs A, B and C wherein said at least one pawl or ratchet comprises plural ratchets equally circumferentially spaced about and circumscribing said periphery of said neck and extending upwardly, generally parallel to said longitudinal axis.
- E. A preform according to paragraphs A, B, C and D wherein said at least one pawl or ratchet comprises plural ratchets equally circumferentially spaced about and circumscribing said periphery of said neck and extending radially inward.
- F. A preform according to paragraphs A, B, C, D and E wherein said at least one pawl or ratchet comprises plural ratchets equally circumferentially spaced about and circumscribing said periphery of said neck and extending radially inward, generally perpendicular to said longitudinal axis.
- G. A preform suitable for blow molding into for an outer container usable for a pressurized aerosol dispenser, said preform having an interior, an exterior, a longitudinal axis and comprising:
  a closed end bottom;
  an open neck longitudinally opposed thereto, said open neck having a periphery and threads for accepting a valve having complementary threads; and
  at least one pawl or ratchet exteriorly operatively juxtaposed with said periphery of said neck, said at least one pawl or ratchet allowing onward rotation of a complementary valve in an onward direction, and preventing detachment of said valve therefrom in a reverse rotation direction.
- H. A preform according to paragraph G comprising interior threads for threadably receiving a valve therein when said preform is blown into an outer container for an aerosol dispenser.
- I. A preform according to paragraphs G and H comprising interior threads for threadably receiving a valve therein when said preform is blown into an outer container for an aerosol dispenser and said at least one pawl or ratchet comprises plural pawls aligned generally parallel to said longitudinal axis.

J. A preform according to paragraphs G, H and I comprising interior threads for threadably receiving a valve therein when said preform is blown into an outer container for an aerosol dispenser and said at least one pawl or ratchet comprises plural pawls aligned generally parallel to said longitudinal axis and disposed on said top of said neck.

K. A preform according to paragraphs G, H, I and J comprising interior threads for threadably receiving a valve therein when said preform is blown into an outer container for an aerosol dispenser, and said at least one pawl or ratchet comprises plural pawls oriented generally radial to said longitudinal axis.

L. A preform according to paragraphs G, H, I, J and K comprising interior threads for threadably receiving a valve therein when said preform is blown into an outer container for an aerosol dispenser, and said at least one pawl or ratchet comprises plural ratchets oriented generally radial to said longitudinal axis and extending radially outward.

M. A preform suitable for blow molding into for an outer container usable for a pressurized aerosol dispenser, said preform having an interior, an exterior, a longitudinal axis and comprising:
an open top;
a closed end bottom;
an open neck longitudinally opposed thereto, said open neck having a periphery and threads for accepting a valve having complementary threads; and
at least one pawl or ratchet operatively peripherally juxtaposed with said top of said neck, said at least one pawl or ratchet allowing onward rotation of a complementary valve in an onward direction, and preventing detachment of said valve therefrom in a reverse rotation direction.

N. A preform according to paragraph M comprising exterior threads for threadably receiving a valve thereon when said preform is blown into an outer container for an aerosol dispenser, and said at least one pawl or ratchet comprises plural ratchets aligned generally radial to said longitudinal axis and extending radially inward.

O. A preform according to paragraph M and N comprising exterior threads for threadably receiving a valve thereon when said preform is blown into an outer container for an aerosol dispenser, and said at least one pawl or ratchet comprises plural ratchets or pawls aligned generally radial to said longitudinal axis and extending radially outward.

P. A preform according to paragraphs M, N, and O comprising interior threads for threadably receiving a valve thereon when said preform is blown into an outer container for an aerosol dispenser, and said at least one pawl or ratchet comprises plural ratchets aligned generally radial to said longitudinal axis and extending radially outward.

Q. A preform according to paragraphs M, N, O and P comprising interior threads for threadably receiving a valve thereon when said preform is blown into an outer container for an aerosol dispenser, and said at least one pawl or ratchet comprises plural ratchets or pawls aligned generally radial to said longitudinal axis and extending radially inward, said threads being disposed below said ratchets or pawls, whereby said ratchets or pawls are juxtaposed with said open top.

R. A preform according to paragraphs M, N, O, P and Q comprising interior threads for threadably receiving a valve thereon when said preform is blown into an outer container for an aerosol dispenser and a single ratchet disposed on said top of said preform and extending parallel to said longitudinal axis.

S. A preform according to paragraphs M, N, O, P, Q and R comprising interior threads for threadably receiving a valve thereon when said preform is blown into an outer container for an aerosol dispenser and a plurality of equally spaced ratchets disposed on said top of said preform and extending parallel to said longitudinal axis.

T. A preform according to paragraphs M, N, O, P, Q, R and S comprising interior threads for threadably receiving a valve thereon when said preform is blown into an outer container for an aerosol dispenser and a plurality of irregularly spaced ratchets disposed on said top of said preform and extending parallel to said longitudinal axis, said irregularly spaced ratchets providing a locating device for a valve threadably received in said open top when said preform is blow into an outer container for an aerosol.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" and a pressure disclosed as "about 1100 kPa" is intended to include 1103.2 kPa.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention

What is claimed is:
1. A preform suitable for blow molding into an outer container usable for a pressurized aerosol dispenser, said preform having a longitudinal axis and comprising:
a closed end bottom;
an open neck longitudinally opposed thereto, said open neck having a periphery and interior threads for accepting a valve having complementary exterior threads; and
at least one pawl or ratchet operatively juxtaposed with said periphery of said neck, said at least one pawl or ratchet allowing onward rotation of said valve in an onward direction, and preventing detachment of said valve therefrom in a reverse rotation direction, wherein said at least one pawl or ratchet comprises plural pawls or ratchets circumscribing said periphery of said neck and extending upwardly, generally parallel to said longitudinal axis, wherein said at least one pawl or ratchet is disposed above at least a portion of said neck interior threads;

a seal disposed below said neck interior threads.

2. The preform according to claim 1, wherein said plural pawls or ratchets are equally circumferentially spaced about said periphery of said neck.

3. The preform according to claim 1, wherein said interior threads are disposed below said plural pawls or ratchets.

4. A preform suitable for blow molding into an outer container usable for a pressurized aerosol dispenser, said preform having an interior, an exterior, a longitudinal axis and comprising:

a closed end bottom;

an open neck longitudinally opposed thereto, said open neck having a periphery and interior threads for accepting a valve having complementary exterior threads; and at least one pawl or ratchet exteriorly operatively juxtaposed with said periphery of said neck, said at least one pawl or ratchet allowing onward rotation of said valve in an onward direction, and preventing detachment of said valve therefrom in a reverse rotation direction, wherein said at least one pawl or ratchet comprises plural pawls or ratchets circumscribing said periphery of said neck and extending upwardly, generally parallel to said longitudinal axis, wherein said at least one pawl or ratchet is disposed above at least a portion of said neck interior threads;

a seal positioned between said closed end bottom and said neck interior threads.

5. The preform according to claim 4, wherein said interior threads threadably receive said valve therein when said preform is blown into said outer container for said pressurized aerosol dispenser.

6. The preform according to claim 4, wherein said interior threads threadably receive said valve therein when said preform is blown into said outer container for said pressurized aerosol dispenser and said plural pawls or ratchets comprise plural pawls aligned generally parallel to said longitudinal axis.

7. The preform according to claim 4, wherein said interior threads threadably receive said valve therein when said preform is blown into said outer container for said pressurized aerosol dispenser and said plural pawls or ratchets comprise plural pawls aligned generally parallel to said longitudinal axis and disposed on a top of said neck.

8. The preform according to claim 4, wherein said interior threads threadably receive said valve therein when said preform is blown into said outer container for said pressurized aerosol dispenser, and said plural pawls or ratchets comprise plural pawls oriented generally radial to said longitudinal axis.

9. The preform according to claim 4, wherein said interior threads threadably receive said valve therein when said preform is blown into said outer container for said pressurized aerosol dispenser, and said plural pawls or ratchets comprise plural ratchets oriented generally radial to said longitudinal axis and extending radially outward.

10. The preform according to claim 4, wherein said interior threads are disposed below said plural pawls or ratchets.

11. A preform suitable for blow molding into an outer container usable for a pressurized aerosol dispenser, said preform having an interior, an exterior, a longitudinal axis and comprising:

an open top;

a closed end bottom;

an open neck longitudinally opposed thereto, said open neck having a periphery and interior threads for accepting a valve having complementary exterior threads; and at least one pawl or ratchet operatively peripherally juxtaposed with said open top of said preform, said at least one pawl or ratchet allowing onward rotation of said valve in an onward direction, and preventing detachment of said valve therefrom in a reverse rotation direction, wherein said at least one pawl or ratchet comprises plural pawls or ratchets circumscribing said periphery of said neck and extending upwardly, generally parallel to said longitudinal axis, wherein said at least one pawl or ratchet is disposed above at least a portion of said neck interior threads;

a seal disposed on said interior of said neck.

12. The preform according to claim 11, wherein said interior threads threadably receive said valve thereon when said preform is blown into said outer container for said pressurized aerosol dispenser, and said plural pawls or ratchets comprise plural ratchets aligned generally radial to said longitudinal axis and extending radially outward.

13. The preform according to claim 11, wherein said interior threads threadably receive said valve thereon when said preform is blown into said outer container for said pressurized aerosol dispenser and said plural pawls or ratchets comprise a plurality of equally spaced ratchets disposed on said open top of said preform and extending parallel to said longitudinal axis.

14. The preform according to claim 11, wherein said interior threads threadably receive said valve thereon when said preform is blown into said outer container for said pressurized aerosol dispenser and said plural pawls or ratchets comprise a plurality of irregularly spaced ratchets disposed on said open top of said preform and extending parallel to said longitudinal axis, said irregularly spaced ratchets providing a locating device for said valve threadably received in said open.

15. The preform according to claim 11, wherein said interior threads are disposed below said plural pawls or ratchets.

* * * * *